United States Patent [19]

Kelley

[11] Patent Number: 4,674,561

[45] Date of Patent: Jun. 23, 1987

[54] AIR TEMPERATURE CONTROL SYSTEM

[76] Inventor: Norman B. Kelley, 1534 Nottingham Dr., Winter Park, Fla. 32792

[21] Appl. No.: 717,190

[22] Filed: Mar. 29, 1985

[51] Int. Cl.$^4$ ............................................... F28D 1/00
[52] U.S. Cl. .................................................... 165/45
[58] Field of Search .......................................... 165/45

[56] References Cited

U.S. PATENT DOCUMENTS

| | | | |
|---|---|---|---|
| 659,375 | 10/1900 | Myers | 165/45 |
| 1,823,661 | 8/1930 | O'Brien | 165/45 |
| 2,789,805 | 4/1957 | Ljungström | 165/45 X |
| 3,424,232 | 1/1969 | Garrett | 165/45 |
| 3,786,858 | 1/1974 | Potter | 165/45 |
| 4,008,709 | 2/1977 | Jardine | 165/45 |
| 4,024,910 | 5/1977 | Werner | 165/45 |
| 4,042,012 | 8/1977 | Perry | 165/45 |
| 4,059,156 | 11/1977 | Berg | 165/45 |
| 4,137,720 | 2/1977 | Rex | 165/95 |
| 4,234,037 | 11/1980 | Rogers et al. | 165/45 X |
| 4,369,635 | 1/1983 | Lambert | 165/45 X |
| 4,384,609 | 5/1983 | Neuzil | 165/45 |
| 4,476,921 | 10/1984 | Stubbolo | 165/45 X |

Primary Examiner—Albert W. Davis, Jr.
Assistant Examiner—Peggy Neils
Attorney, Agent, or Firm—Renfro, Julian C.

[57] ABSTRACT

An air temperature control system which is highly energy efficient and virtually maintenance free. The system includes an intake conduit for receiving air at a non-selected temperature, an exit conduit for delivering the air at a controlled temperature to a preselected location, a heat exchanger located below the surface of the ground, and a heat sink preferably of limestone which surrounds the heat exchanger and which adjusts the temperature of the air flowing through the heat exchanger to a controlled temperature. A fan effects the flow of air through the system.

8 Claims, 3 Drawing Figures

AIR TEMPERATURE CONTROL SYSTEM

BACKGROUND OF THE INVENTION

1. Field of the Invention

This invention relates to air temperature control systems, and particularly to a new and improved system which is extremely energy efficient and virtually maintenance free.

2. Description of the Prior Art

Various types of temperature control systems have been developed to maintain comfortable conditions within homes and other buildings. Some systems are used only for heating air, employing gas, oil, electric, or other types of furnaces through which air is blown to heat it. Other systems are used only for cooling air, such as the traditional air conditioning unit. Such air conditioning units typically employ an electrically operated compressor together with a condenser and refrigerant which work together to remove heat from interior air and pass the heat to the outside of the building.

Modern systems, such as the heat pump, are used to both heat and cool air. Heat pumps employ an electrically operated compressor together with refrigerant. For heating purposes, the refrigerant absorbs heat from outside sources, is compressed to further increase its temperature, and then flows through a heat exchanger across which room air is passed, the air absorbing heat from the refrigerant. For cooling purposes, the refrigerant flows at high temperature through outside coils which absorb heat from the refrigerant, and the cooled refrigerant then passes through the heat exchanger which absorbs heat from the room air.

Although the above described systems work satisfactorily, they all inherently have several disadvantages. Each of the systems consumes a relatively large amount of energy, whether that energy is in the form of electricity, oil, gas, or other fuels. Second, the systems include relatively complex and expensive components. As a result, the initial costs of the systems are typically high and repair and replacement of the components can also be costly. Thirdly, the system components can be expected to wear out, with replacement being time consuming as well as costly. Finally, most cooling systems as well as some heating systems require the use of a refrigerant, such as freon, in a closed subsystem which must be replenished whenever leaks develop or when certain maintenance is performed.

In view of the above described problems, it is therefore an object of the present invention to provide an air temperature control system which consumes a relatively small amount of energy.

Another object of the present invention is to provide a system comprising simple, low cost components.

Yet another object of the present invention is to provide a system requiring minimal maintenance.

Still another object of the present invention is to provide a system requiring no refrigerant.

SUMMARY OF THE INVENTION

The present invention, in accordance with one embodiment thereof, comprises an air temperature control system and includes an intake conduit for receiving air at a non-selected temperature, an exit conduit for delivering air at a controlled temperature to a preselected location, and a heat exchanger in fluid communication with the intake conduit for receiving air therefrom and with the exit conduit for delivering air thereto and having at least one exchange conduit. A heat sink is disposed in close proximity to the heat exchanger for facilitating the exchange of heat between the air in the exchange conduit and the heat sink. Both the heat exchanger and heat sink are located in a subsurface environment at a depth selected for its substantially constant temperature. Means for effecting the flow of air through the system is also included.

In a particular embodiment of the invention, the heat exchanger comprises copper tubing as exchange conduits and the heat sink comprises a limestone bed. An alkali, such as sodium bicarbonate ($NaHCO_3$), can be placed around the copper tubing to reduce corrosion and also improve heat transfer efficiency.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
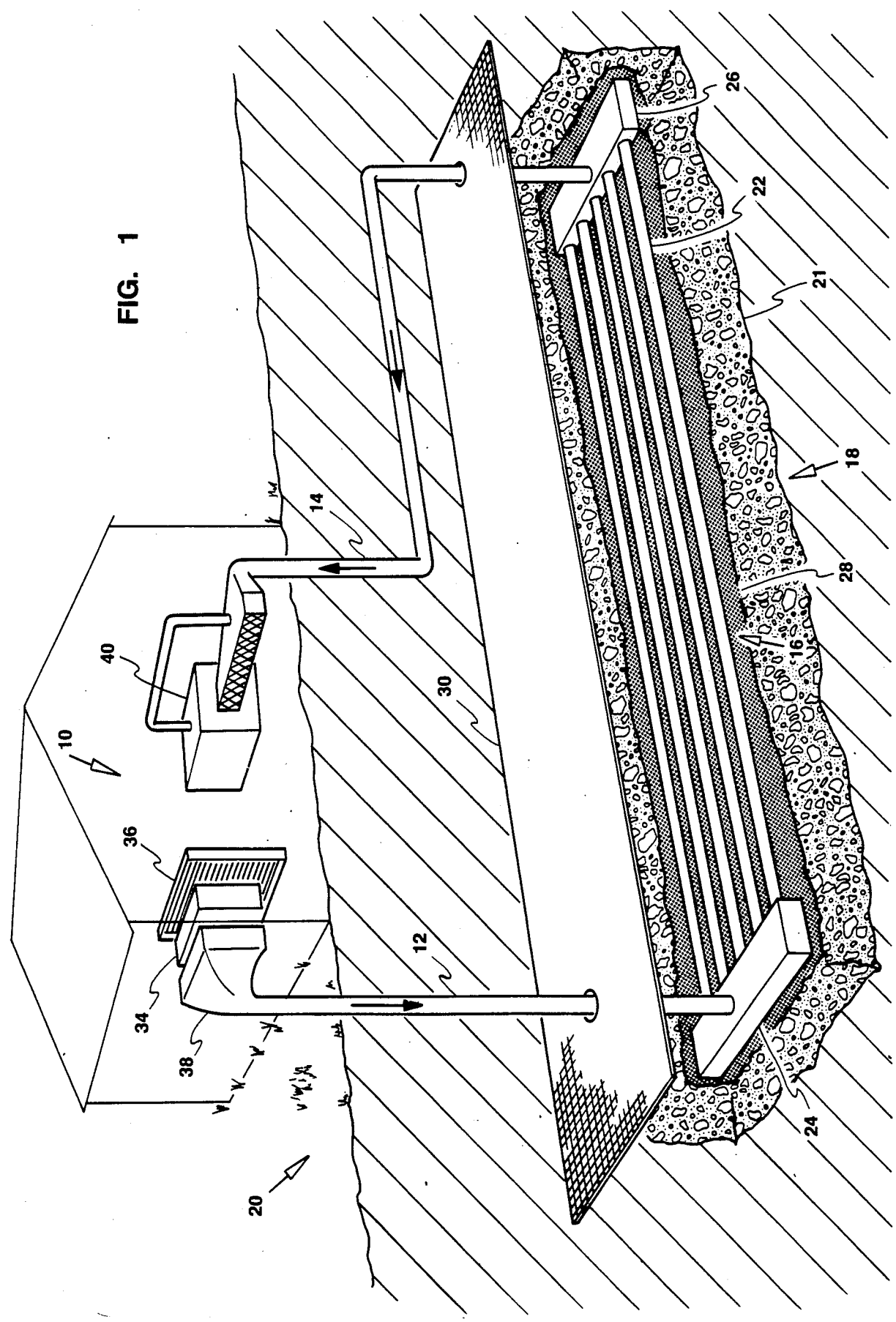
FIG. 1 is a perspective view of the air temperature control system of the present invention.

Turning now to a consideration of the drawing, and in particular to FIG. 1, there is shown the air temperature control system 10 of the present invention. The purpose of the system 10 is to efficiently and economically control the temperature of air flowing through the system such that the air exits at a preselected temperature. The system 10 is particularly suitable for use in controlling the air temperature in homes and other buildings. The size and component dimensions of the system 10 will vary directly with the volume of air to be controlled. Multiple systems 10 can be employed where air volume is large.

The system 10 comprises an intake conduit 12, an exit conduit 14, a heat exchanger 16, and a heat sink 18. As will be described in more detail hereinafter, air at a non-selected temperature is forced through the intake conduit 12 to the heat exchanger 16. While flowing through the heat exchanger 16, heat is either transferred from or transferred to the air, depending upon whether its initial temperature is warmer or cooler, respectively, than the heat sink 18 which is at the desired temperature. The air, which is now at the desired temperature, leaves the heat exchanger 16 and flows through the exit conduit 14 which delivers the air to a preselected location.

As will be seen, the components of the system 10 are simple, low cost components which require minimal, if any, maintenance. Additionally, the system 10 does not require a refrigerant as many prior art systems do. Rather, the air itself flows through the heat exchanger 16.

The intake and exit conduits 12 and 14 are fabricated of any desired material. It was found that PVC pipe worked very well due to its light weight, low cost, and ease of attachment to other components.

The heat exchanger 16 should be positioned in the proper environment and fabricated of suitable materials such that the heat transfer capability of the system 10 will be maximized.

Looking first at the environment in which the heat exchanger 16 is positioned, the heat exchanger is positioned within or in close proximity to a heat sink 18. The term "heat sink" as used herein is intended to mean not only material which will absorb heat from the air passing through the heat exchanger 16 but also material which will transfer heat to the air passing through the heat exchanger 16 if that air is at a lower temperature than the temperature of the material of the heat sink 18.

Preferably, as can be seen in FIG. 1, the heat sink 18 is made of naturally occuring materials so as to be of low cost and high reliability, and is located in a subsurface environment at a depth selected for its substantially constant temperature. Although the subsurface environment of the heat sink 18 will hereinafter be described as being beneath the surface 20 of the ground, it is to be understood that other subsurface environments such as beneath the surface of bodies of water could be employed with the system 10 as well.

The underground depth at which the desired constant temperature for the air in the system 10, hereinafter "system temperature", will be found will vary depending upon the climate, type of soil, and other factors. For example, where a desired system temperature was 72 degrees F., that constant temperature was found at a depth of approximately 8 feet below ground level in a subtropical region of the southeastern United States which had sandy soil.

The heat sink 18 should be comprised of appropriate materials and be of sufficient size such that the temperature of the air flowing into the heat exchanger 16 will be brought to system temperature by the time the air leaves the heat exchanger. In some geographical areas, the subsurface soil type may already be effective as an efficient heat sink such that no special materials need be added to it. In that case, the heat exchanger 16 would simply be buried in the ground at system temperature depth. In other geographical areas, however, the soil type is such that other materials need be added to the soil or, perhaps, even replace the soil. For example, it was found that sandy soil was not an efficient heat sink. As is shown in FIG. 1, it was found that when the sand was replaced by a bed of limestone, a commonly found, low cost chemical, the heat transfer rate between the heat exchanger 16 and the heat sink 18 was greatly improved.

Figure 2:
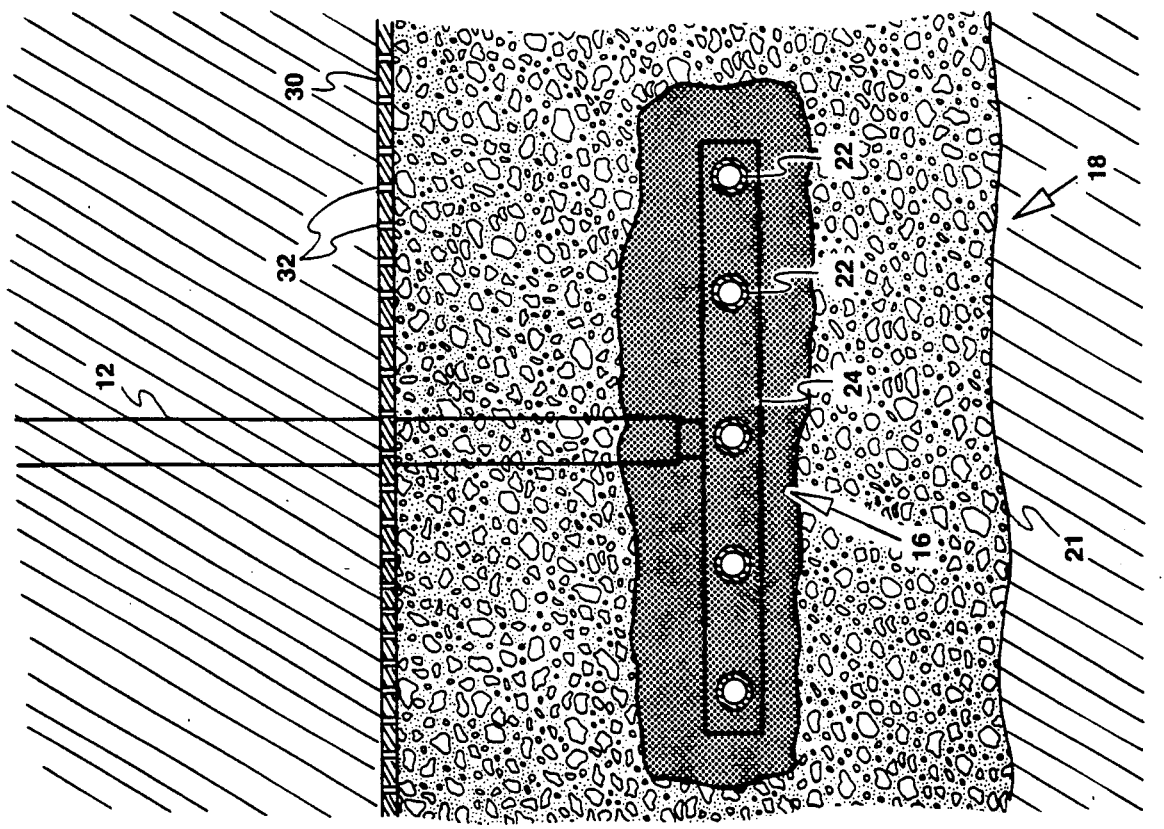
FIG. 2 is a cross sectional view of the heat exchanger and heat sink taken along lines 2—2 of FIG. 3.

The dimensions of the heat sink 18 are also important. It must be large enough that sufficient heat transfer can occur to bring the air to system temperature before it leaves the heat exchanger 16. On the other hand, too large a heat sink will increase the cost of constructing the system 10 without significantly adding to its effectiveness or efficiency. For example, as can be seen in FIG. 2, it was found that when 2-inch copper tubing was used as exchange conduits 22 in the heat exchanger 16 with parallel conduits 24 inches apart, an efficient heat sink 18 was provided by a limestone bed, indicated at 21. The limestone fragments averaged 1 to 2 inches in diameter and the dimensions of the bed were 12 inches above, 12 inches below and 12 inches to either side of the heat exchanger 16 such that each exchange conduit 22 was surrounded by limestone to a radius of at least 12 inches. Of course, these dimensions and the spacing between conduits 22 are presented as examples only since the climatic and soil conditions as well as the size of the conduits 22 and the heat sink materials may require different heat sink dimensions for optimization of heat transfer.

Figure 3:
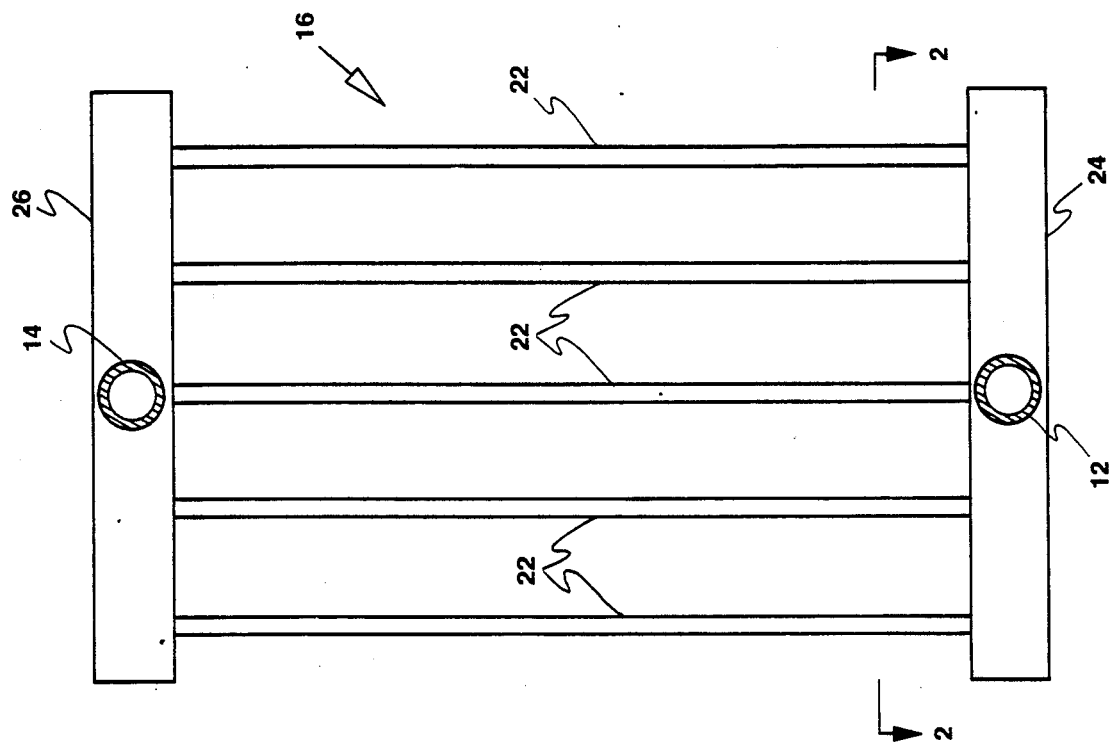
FIG. 3 is a top view of the heat exchanger.

As is best seen in FIG. 3, the heat exchanger 16 comprises at least one, and preferably a plurality of exchange conduits 22 through which the air in the system 10 flows. The exchange conduits 22 are exposed to the heat sink 18 and it is through the walls of the conduits 22 that heat is either taken away from or added to the air. For ease of installation, it is preferably that the exchange conduits 22 extend parallel to each other and are spaced apart a sufficient distance that they do not interfere with each other's heat transfer. Of course, the exchange conduits 22 could, if desired, be arranged in any other non-parallel arrangement as well.

When the heat exchanger 16 includes more than one exchange conduit 22, it is preferably that the heat exchanger also include an intake manifold 24, disposed between and in fluid communication with the intake conduit 12 and each of the exchange conduits 22, and an exit manifold 26, disposed between and in fluid communication with the exit conduit 14 and each of the exchange conduits 22. The intake and exit manifolds 24 and 26 can be fabricated of any material suitable for the subsurface environment in which they will be located. A suitable material is copper.

The intake and exit manifolds 24 and 26 have internal configurations which provide even dispersion of the airflow among all of the exchange conduits 22. In addition, each of the exchange conduits 22 should be of uniform diameter to facilitate equal amounts of airflow through each of the exchange conduits. If the airflow were not equally divided among the exchange conduits 22, the exchange conduits which received the greater amount of airflow would exchange less heat than they otherwise would and system efficiency would decrease.

The exchange conduits 22 can be fabricated of any suitable material but are preferably fabricated of a material which has high thermal conductivity so as to more easily facilitate the exchange of heat between the air in the exchange conduits and the heat sink 18. It was found that copper tubing was particularly suitable for use as exchange conduits 22 because of its thermal conductivity and its ability to withstand the underground environment.

Returning to FIG. 1, it was found that when limestone was used as a heat sink 18 and copper tubing was used as exchange conduits 22, that the carbonic acid in the limestone tended to cause the copper tubing to experience a certain amount of corrosion. It was also found that when an alkali, such as sodium bicarbonate (NaHCO$_3$), indicated at 28, was added to the heat sink 18 in the immediate vicinity of the copper exchange conduits 22, that the acid was neutralized thereby preventing corrosion of the copper tubing. An additional benefit resulted from use of the sodium bicarbonate 28. It was found that there was an approximate ten percent increase in the heat transfer rate between the exchange conduits 22 and the limestone bed 21 when the sodium bicarbonate was placed around the exchange conduits as compared to when the limestone was used without the sodium bicarbonate.

Because neither the heat exchanger 16 nor the intake or exit conduits 14 or 16 contain any moving parts, once those components are buried underground, there there would be virtually no reason to perform any maintenance on them. Thus, for example, the heat exchanger 16 could be buried beneath a concrete slab or concrete basement floor of a house or other building. The system 10, with the possible exception of the fan 34 to be described hereinafter, is virtually maintenance free.

In order to maintain the integrity of the heat sink 18 and keep out unwanted material, such as sand, which might decrease the rate of heat transfer between the exchange conduits 22 and the heat sink 18, it is preferable that screening means such as the screen 30 be positioned above the heat sink 18. The screen 30 includes pores 32, best seen in FIG. 2, which permit liquids to pass through but prevent solid particles larger than a preselected size from passing through. The presence of moisture within the heat sink 18 was found not to have a deleterious effect on either the limestone 21 or the sodium bicarbonate 28.

Returning now to FIG. 1, the system 10 includes means for effecting the flow of air through the intake conduit 12, the heat exchanger 16 and the exit conduit 14. For example, a fan 34 can be used to blow air at a non-selected temperature from a grating 36 into the intake conduit 12. A filter 38 can be placed between the fan 34 and the entrance to the intake conduit 12 to exclude undesirable materials from the system 10. Of course, the fan 34 could be repositioned adjacent the exit conduit 14 so as to pull, rather than push, air through the system 10. As can be seen, the fan 34 is the only energy consuming machine in the system 10. Thus, the system 10 is extremely energy efficient compared to prior art cooling and heating systems. If desired, a humidifier 40 can be used in the system to add moisture to the exiting air.

As can be seen from the above description, no compressors are needed in the system 10 nor is there any need for a closed refrigerant subsystem. Thus the system 10 in addition to being energy efficient provides the equivalent heating and cooling of prior art systems which have much higher electrical energy demands.

It is to be understood that this invention is not limited to the particular embodiments disclosed and it is intended to cover all modifications coming within the true spirit and scope of this invention as claimed.

What is claimed is:

1. A system for controlling the temperature of air continuously flowing therethrough comprising:
   (a) an intake conduit for receiving air at a non-selected temperature;
   (b) an exit conduit for delivering such air at a preferred temperature to a preselected location;
   (c) a subsurface heat exchanger in fluid communication with said intake conduit for receiving air therefrom and with said exit conduit for delivering such air thereto and comprising at least two exchange conduits through which such air flows, each of said conduits being made of copper tubing of substantially the same length and diameter, with air flowing through said heat exchanger being isolated from direct exposure to subsurface contaminants;
   (d) a heat sink disposed in close proximity to said heat exchanger for facilitating the exchange of heat between the air flowing through said exchange conduit and said heat sink for thereby adjusting the temperature of the air to said preferred temperature, said heat exchanger and said heat sink being located at a subsurface depth selected for its substantially constant temperature; said heat sink including the use of a chemical bed comprising limestone and an alkali in the presence of water, thus to enhance heat transfer to or from said copper tubing; and
   (e) means for effecting a continuous flow of air through said intake conduit, said exchange conduit and said exit conduit.

2. The system of claim 1 wherein said heat exchanger further comprises an intake manifold disposed between and in fluid communication with said intake conduit and each of said exchange conduits and an exit manifold disposed between and in fluid communication with said exit conduit and each of said exchange conduits.

3. The system of claim 2 wherein said exchange conduits extend parallel to each other and are spaced apart.

4. The system of claim 3 wherein said alkali comprises sodium bicarbonate.

5. The system of claim 1 wherein said heat sink further comprises screening means disposed above said chemical bed having pores sized for preventing solid particles of preselected size from passing therethrough.

6. The system of claim 1 further comprising means for filtering said air.

7. The system of claim 1 further comprising humidifying means for controlling the humidity of said air.

8. A system for controlling the temperature of air flowing continuously therethrough comprising:
   (a) an intake conduit for receiving air at a non-selected temperature;
   (b) an exit conduit for delivering such air at a preferred temperature to a preselected location;
   (c) a subsurface heat exchanger in fluid communication with said intake conduit for receiving air therefrom and with said exit conduit for delivering such air thereto and comprising:
      (1) a plurality of exchange conduits through which air flows in a manner completely isolated from subsurface contaminants, said exchange conduits being fabricated of copper, being of uniform diameter, and extending generally parallel to each other;
      (2) an intake manifold disposed between and in fluid communication with said exit conduit and each of said exchange conduits;
      (3) an exit manifold disposed between and in fluid communication with said exit conduit and each of said exchange conduits;
   (d) a heat sink surrounding said heat exchanger for facilitating the exchange of heat between the air flowing through said exchange conduits and said heat sink for thereby adjusting the temperature of the air to said preferred temperature, said heat sink comprising a bed of limestone and an alkali, said heat exchanger and said heat sink being located below the surface of the ground at a depth selected for the presence of ground water and its substantially constant temperature; and
   (e) a fan disposed for effecting a continuous flow of air through said intake conduit, said exchange conduits and said exit conduit.

* * * * *